(12) United States Patent
Yang et al.

(10) Patent No.: US 12,069,706 B2
(45) Date of Patent: Aug. 20, 2024

(54) METHOD FOR TRANSMITTING SIGNAL, NETWORK DEVICE AND TERMINAL DEVICE

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN); Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/740,287

(22) Filed: May 9, 2022

(65) Prior Publication Data

US 2022/0272710 A1 Aug. 25, 2022

Related U.S. Application Data

(63) Continuation of application No. 16/621,675, filed as application No. PCT/CN2017/088508 on Jun. 15, 2017, now Pat. No. 11,343,830.

(51) Int. Cl.
*H04W 72/541* (2023.01)
*H04W 72/044* (2023.01)
*H04W 72/51* (2023.01)

(52) U.S. Cl.
CPC ....... *H04W 72/541* (2023.01); *H04W 72/044* (2013.01); *H04W 72/51* (2023.01)

(58) Field of Classification Search
CPC .......................... H04W 72/082; H04W 72/044; H04W 72/048
See application file for complete search history.

(56) References Cited

U.S. PATENT DOCUMENTS 9,119,177 B2 8/2015 Eguchi
2010/0234040 A1 9/2010 Palanki et al.
(Continued)

FOREIGN PATENT DOCUMENTS

CN 104469785 A 3/2015
CN 105519167 A 4/2016
(Continued)

OTHER PUBLICATIONS

Israel First Office Action for IL Application 271094 mailed May 25, 2022. (11 pages).
(Continued)

*Primary Examiner* — Kevin M Cunningham
(74) *Attorney, Agent, or Firm* — Young Basile Hanlon & MacFarlane, P.C.

(57) ABSTRACT

Described are a method for transmitting a signal, a network device and a terminal device. The method includes: sending, by a first terminal device, second indication information to a second network device, wherein the second indication information is used for indicating a capability of the first terminal device to receive a signal through a first frequency band and/or interference information of interference caused by a second frequency band to a first frequency band; wherein the first frequency band is a new radio (NR) carrier, and the second frequency band is a long term evolution (LTE) carrier; and receiving, by the first terminal device, signals sent by a first network device within the first frequency band.

7 Claims, 7 Drawing Sheets

(56) References Cited

U.S. PATENT DOCUMENTS

| | | | |
|---|---|---|---|
| 2011/0128919 | A1 | 6/2011 | Kim et al. |
| 2013/0044621 | A1 | 2/2013 | Jung et al. |
| 2015/0148089 | A1 | 5/2015 | Chirayil |
| 2016/0128071 | A1* | 5/2016 | Ngai .............. H04W 72/541 370/329 |
| 2016/0233989 | A1 | 8/2016 | Belghoul et al. |
| 2016/0269137 | A1 | 9/2016 | Lindoff et al. |
| 2016/0269166 | A1* | 9/2016 | Yang .................. H04W 74/08 |
| 2016/0330645 | A1 | 11/2016 | Mishra et al. |
| 2017/0005775 | A1 | 1/2017 | Cheng et al. |
| 2018/0049213 | A1* | 2/2018 | Gholmieh ........ H04W 72/1215 |
| 2018/0220295 | A1 | 8/2018 | Takahashi et al. |
| 2019/0013881 | A1* | 1/2019 | Olesen ............... H04B 15/02 |

FOREIGN PATENT DOCUMENTS

| | | |
|---|---|---|
| CN | 105766047 A | 7/2016 |
| CN | 105940651 A | 9/2016 |
| CN | 106464455 A | 2/2017 |
| CN | 106559791 A | 4/2017 |
| CN | 106686625 A | 5/2017 |
| EP | 2225906 A2 | 9/2010 |
| EP | 3058787 A1 | 8/2016 |
| EP | 3078225 A1 | 10/2016 |
| JP | 2011135348 A | 7/2011 |
| JP | 2013541920 A | 11/2013 |
| JP | 2017092827 A | 5/2017 |
| RU | 2488982 C2 | 7/2013 |
| WO | 2017057439 A1 | 4/2017 |

OTHER PUBLICATIONS

Indonesia First Office Action with English Translation for ID Application P00201912283 mailed Jul. 29, 2022. (6 pages).
European search report issued in corresponding European application No. 17913506.6 dated Apr. 3, 2020.
3GPP TSG-RAN WG4 NR AH Meeting; Spokane, Washington, USA, Jan. 17-19, 2017; R4-1700012.
3GPP TSG RAN WG1 Meeting #89; Hangzhou, China, May 15-19, 2017; R1-1706906.
3GPP TSG RAN WG1 Meeting #89; Hangzhou, P.R. China, May 15-19, 2017; R1-1707807.
3GPP TSG RAN WG1 Meeting #89; Hangzhou, China, May 15-19, 2017; R1-1708062.
English Translation Russian First Office Action dated Jul. 9, 2020.
3GPP TSG RAN WG1 Meeting #88bis; R1-1704328; Spokane, USA Apr. 3-7, 2017.
3GPP TSG RAN WG1 RAN1 NR BIS; R1-1705642; Apr. 3-7, 2017 Spokane, US.
India First Office Action for IN Application 201917048680 mailed Feb. 1, 2021.
Communication pursuant to Article 94(3) EPC Examination for EP Application 17913155.2 mailed Nov. 25, 2020.
Canada First Office Action for CA Application 3065385 mailed Jan. 29, 2021.
China First Office Action with English Translation for CN application 202010081172.1 mailed May 7, 2021.
Chile First Office Action with English Translation for CL Application 2019-003608 mailed Feb. 18, 2021.
Communication pursuant to Article 94(3) EPC for EP Application 17913155.2 mailed Jun. 4, 2021. (10 pages).
Japanese Office Action with English Translation for JP Application 2019-568032 mailed Jul. 27, 2021. (8 pages).
Singapore Invitation to Respond to Written Opinion for SG Application 11201911287P mailed May 12, 2021. (8 pages).
Taiwan Office Action with English Translation for TW Application 107118391 mailed Jul. 15, 2021. (11 pages).
Canadian Examination Report for CA Application 3065385 mailed Oct. 6, 2021. (4 pages).
Korean Office Action with English Translation for KR Application 1020197036853 mailed Aug. 20, 2021. (15 pages).
Communication pursuant to Article 94(3) EPC for EP Application 17913155.2 mailed Dec. 9, 2021. (6 pages).
Chile Office Action with English Translation for CL Application 2019003608 mailed Oct. 22, 2021. (38 pages).
Korean Office Action with English Translation for KR Application 1020197036853 mailed Feb. 14, 2022. (11 pages).
International Search Report with English Translation for PCT Application PCT/CN2017/088508 mailed Sep. 1, 2017. (4 pages).
Canadian Third Examination Report for CA Application 3065385 mailed Aug. 19, 2022. (3 pages).
Vietnam Substantive Examination Report with English Translation for VN Application 1201907268 mailed Oct. 28, 2022. (3 pages).
Extended European Search Report for EP Application 22204217.8 mailed Feb. 14, 2023. (9 pages).
Canadian Examination Report for CA Application 3065385 mailed May 15, 2023. (3 pages).
Chinese First Office Action with English Translation for CN Application 201780091986.X mailed Jul. 29, 2023. (40 pages).
Malaysian substantive examination adverse report for MY application PI 2019007042 mailed Jan. 24, 2024. (3 pages).
Brazilian First Preliminary Examination Report with English Translation for BR Application 1120190262067 mailed Jan. 2, 2024. (8 pages).
Chinese Second Office Action with English Translation for CN Application 201780091986.X mailed Feb. 7, 2024. (7 pages).

* cited by examiner

US 12,069,706 B2

METHOD FOR TRANSMITTING SIGNAL, NETWORK DEVICE AND TERMINAL DEVICE

CROSS-REFERENCE TO RELATED APPLICATION(S)

This application is a continuing application of U.S. application Ser. No. 16/621,675 filed on Dec. 11, 2019, which is a 371 application of International Application No. PCT/CN2017/088508, filed on Jun. 15, 2017, the entire disclosures of both of which are hereby incorporated by reference.

TECHNICAL FIELD

Implementations of the present disclosure relate to the communication field, and more particularly, relate to a method for transmitting a signal, a network device, and a terminal device.

BACKGROUND

At present, in research of New Radio (NR), how to improve transmission reliability is always a research problem due to a working frequency band for transmitting signals.

SUMMARY

In view of this, implementations of the present disclosure provide a method for transmitting a signal, a network device and a terminal device.

In a first aspect, there is provided a method for transmitting a signal, and the method includes: determining, by a first network device, a time-frequency resource for transmitting a signal in a first frequency band corresponding to the first network device; and transmitting, by the first network device, a signal with a first terminal device on the time-frequency resource.

A frequency band refers to the part of radio spectrum located between specific frequency boundaries. Generally speaking, the frequency band refers to a frequency range between a highest frequency and a lowest frequency on which a signal is allowed to be transmitted. Here, it refers to a frequency resource with a certain width in frequency domain, and the restriction in time domain is not necessary. For example, the frequency band may be a carrier.

A network device may refer to a device that may provide network services physically, or may be a device that may provide network services logically. For example, the network device may be a Transmission and Reception Point (TRP).

The first frequency band corresponding to the first network device means that the first frequency band is configured for the first network device to transmit a signal. The first frequency band may be used by the first network device to transmit the signal of the first network device to the terminal device, or may be used by the first network device to receive a signal transmitted from the terminal device. It should be understood that, the corresponding here may be specified in a protocol, or may be negotiated between network devices, or may be configured by a primary network device to a secondary network device.

The network device further determines the time-frequency resource for transmitting the signal with the terminal device within the configured frequency band, which is beneficial to improving transmission reliability.

In a possible implementation, the method further includes: receiving, by the first network device, first indication information; wherein determining, by the first network device, the time-frequency resource for transmitting the signal in the first frequency band corresponding to the first network device, includes: determining, by the first network device, the time-frequency resource according to the first indication information.

The first indication information is sent based on interference caused by a second frequency band to the first frequency band.

The second network device may acquire a frequency band configured for other network devices, and may use a certain rule to configure resources for the frequency band of other network devices according to interference of a frequency band configured for the second network device to the frequency band of other network devices, and inform other network devices of a situation of the frequency band configuration by the second network device for other network devices.

In a possible implementation, the first frequency band is used for transmitting a downlink signal and the second frequency band is used for transmitting an uplink signal; or the first frequency band is used for transmitting an uplink signal and the second frequency band is used for transmitting a downlink signal.

Transmission directions of the first frequency band and the second frequency band are exactly opposite. For example, the first frequency band may be configured for the first network device to receive a signal from the terminal device, and the second frequency band may be configured for the first network device or other network devices to send a signal to the terminal device; or, the first frequency band may be configured for the first network device to send a signal to the terminal device, and the second frequency band may be configured for the first network device or other network devices to receive a signal sent by the terminal device.

In a possible implementation, the first indication information is used for indicating a scheduling mode of each time domain unit within a first period in the first frequency band for the first network device, and/or the first indication information is used for indicating a scheduling mode of each frequency domain unit in the first frequency band for the first network device. Determining, by the first network device, the time-frequency resource for transmitting the signal in the first frequency band corresponding to the first network device, includes: the first network device determining the time-frequency resource according to at least one of the scheduling mode of each time domain unit or the scheduling mode of each frequency domain unit.

The above period and the number of the time domain units may be negotiated between the network devices in advance or configured by a primary network device. For example, a period of 10 time slots may be specified in advance, and the time domain unit may be one time slot, or may be two time slots, etc.

The first indication information may be a bit map defined broadly. For example, x0 may be used for representing that the time domain unit may be used for transmitting a signal, x1 represents that the time domain unit is prohibited to be used for transmitting a signal, x2 may represent that the time domain unit may be used for transmitting a signal only with a certain restriction, etc.

The number of frequency domain units into which the first frequency band is divided and a size of the frequency domain unit may be negotiated between the network devices in advance or configured by a primary network device. For example, it can be specified in advance that the first frequency band is divided by 15 kHz, that is, the frequency domain unit is 15 kHz, or an integer multiple of 15 kHz.

Similarly, each frequency domain unit in the first frequency band may be indicated by a bit map defined broadly.

In a possible implementation, the scheduling mode includes allowing scheduling, prohibiting scheduling, or scheduling by using an adjusted or restricted level of a coding and modulation scheme.

The scheduling mode may be to limit a certain number of terminal devices to allow scheduling.

In a possible implementation, the first indication information is used for indicating at least two kinds of information of: a starting position in time domain, a length in time domain, and an ending position in time domain of the time-frequency resource; and/or the first indication information is used for indicating at least two kinds of information of: a starting position in frequency domain, a bandwidth, and an ending position in frequency domain of the time-frequency resource.

The first indication information may be used for indicating at least two kinds of information of: a starting position in time domain, a length in time domain, and an ending position in time domain of a restricted time-frequency resource in the first frequency band, and/or the first indication information may be used for indicating at least two kinds of information of: a starting position in frequency domain, a bandwidth, and an ending position in frequency domain of a restricted time-frequency resource in the first frequency band, so the first network device can determine a time-frequency resource allowed to be scheduled according to the restricted time-frequency resource indicated in the first indication information.

In a possible implementation, the first indication information is used for indicating time domain configuration information of an uplink and downlink frequency band corresponding to a second network device within a second period, the uplink and downlink frequency band includes a second frequency band causing interference to the first frequency band. Determining, by the first network device, the time-frequency resource according to the first indication information, includes: the first network device determines the time-frequency resource according to the time domain configuration information.

In the implementation, the period is similar to that described above, which may be agreed or configured in advance. Generally, a part of the frequency band configured for the network device is used for transmitting an uplink signal, and the other part is used for transmitting a downlink signal, that is, the frequency band configured for network device includes an uplink frequency band and a downlink frequency band. The uplink frequency band may be the same as the downlink frequency band, but staggered in the time domain, which is the so-called time-division multiplexing. As long as the first network device obtain time domain configuration information of the frequency band corresponding to other network devices, that is, an uplink and downlink configuration condition in one period, the first network device may automatically determine a schedulable time domain resource in the first frequency band or a time domain resource of which scheduling is restricted according to certain rules, on the basis of the uplink and downlink configuration condition.

In a possible implementation, the method further includes: receiving, by the first network device, terminal configuration information of the first terminal device; wherein, determining, by the first network device, the time-frequency resource for transmitting the signal in the first frequency band corresponding to the first network device, includes: determining, by the first network device, the time-frequency resource corresponding to the first terminal device according to the terminal configuration information.

Different terminal devices under the first network device may correspond to different configuration modes in the first frequency band, or different groups of terminal devices may correspond to different configuration modes in the first frequency band. Other network devices may send identification of the first terminal device or a group number to which the first terminal device belongs when sending the first indication information to the first network device, so that the first network device may know that the time-frequency resource indicated by the first indication information may be used for transmitting the signal of the first terminal device. Or, the above corresponding relationship may be stored among the network devices, and other network devices only need inform the first network device the identification of the first terminal device or the group number to which the first terminal device belongs.

The time-frequency resource indicated by the first indication information may be applicable to all terminal devices under the first network device.

In a possible implementation, the first frequency band is a new radio (NR) carrier, and/or the second frequency band is a long term evolution (LTE) carrier or an NR carrier.

In a possible implementation, a cell corresponding to the second frequency band is a primary cell.

In a second aspect, there is provided a method for transmitting a signal, and the method includes: sending, by a second network device, first indication information to a first network device according to interference caused by a second frequency band to a first frequency band, wherein the first indication information is used for the first network device to determine a time-frequency resource that is capable of being used for transmitting a signal in the first frequency band.

In a possible implementation, the first frequency band is used for transmitting a downlink signal and the second frequency band is used for transmitting an uplink signal; or the first frequency band is used for transmitting an uplink signal and the second frequency band is used for transmitting a downlink signal.

In a possible implementation, the first indication information is used for indicating a scheduling mode of each time domain unit within a first period in the first frequency band for the first network device, and/or the first indication information is used for indicating a scheduling mode of each frequency domain unit in the first frequency band for the first network device.

In a possible implementation, the scheduling mode includes allowing scheduling, prohibiting scheduling, or scheduling by using an adjusted or restricted level of a coding and modulation scheme.

In a possible implementation, the first indication information is used for indicating at least two kinds of information of: a starting position in time domain, a length in time domain, and an ending position in time domain of the time-frequency resource; and/or the first indication information is used for indicating at least two kinds of information of: a starting position in frequency domain, a bandwidth, and an ending position in frequency domain of the time-frequency resource.

In a possible implementation, the first indication information is used for indicating time domain configuration information of an uplink and downlink frequency band corresponding to the second network device within a second period, and the uplink and downlink frequency band includes a second frequency band.

In a possible implementation, the first indication information is used for indicating a time-frequency resource of a first terminal device, wherein the first terminal device is a terminal device to which the first network device provides a network service.

In a possible implementation, the method further comprises: receiving, by the second network device, second indication information sent from the first terminal device, wherein the second indication information is used for indicating at least one of a capability of the first terminal device to receive a signal through the first frequency band, or interference information of interference caused by the second frequency band to the first frequency band; wherein sending, by the second network device, the first indication information to the first network device according to the interference caused by the second frequency band to the first frequency band, includes: determining the time-frequency resource of the first terminal device according to the interference information; and sending the first indication information to the first network device.

Interference caused by different terminal devices to different frequency bands has different impacts on different terminal devices, or capabilities of different terminal devices to receive signals may be different. The terminal device may report relevant information which is used for indicating degree of mutual interference caused by simultaneous transmission of different frequency bands. A reception sensitivity value, reception impact level, etc., of the terminal device may be reduced. The reception impact level may be fixed in advance by a protocol.

The interference information may be an interference type of the interference caused by the second frequency band to the first frequency band, and the interference type includes at least one of harmonic interference or intermodulation interference.

In other words, harmonic interference may correspond to a configuration mode of a time-frequency resource in the first frequency band, intermodulation interference may correspond to a configuration mode of a time-frequency resource in the first frequency band, and harmonic interference plus intermodulation interference may correspond to another configuration mode of a time-frequency resource in the first frequency band.

In a possible implementation, the first frequency band is a new radio (NR) carrier and the second frequency band is a long term evolution (LTE) carrier or a new radio (NR) carrier.

In a possible implementation, a cell corresponding to the second frequency band is a primary cell.

In a third aspect, there is provided a method for transmitting a signal, and the method includes: receiving, by a second network device, second indication information sent from a first terminal device, wherein the second indication information is used for indicating at least one of a capability of the first terminal device to receive a signal through a first frequency band, or interference information of interference caused by a second frequency band to a first frequency band.

In a possible implementation, the method further includes: determining, by the second network device, a time-frequency resource for transmitting a signal of the first terminal device in the first frequency band according to the second indication information.

The first frequency band may be configured for the second network device to perform signal transmission with the first terminal device, or may be configured for other network devices, such as the first network device, to perform signal transmission with the first terminal device. In other words, after the second network device determines the time-frequency resource of the first terminal device, the second network device may directly use the time-frequency resource to perform the signal transmission with the first terminal device. The indication information indicating the time-frequency resource may be sent to other network devices, so that the other network devices may use the time-frequency resource to perform signal transmission with the first terminal device.

According to isolation degrees of different terminal devices to interference, the time-frequency resource for the terminal device is determined, by which performance of the terminal device can be fully utilized, thus it is beneficial to improving the transmission reliability.

In a possible implementation, the second frequency band is used for transmitting an uplink signal.

In a possible implementation, the interference information includes at least one of degree of impact on the first terminal device by the interference caused by the second frequency band to the first frequency band, or an interference type of the interference caused by the second frequency band to the first frequency band, wherein the interference type includes at least one of harmonic interference or intermodulation interference.

In a possible implementation, the second indication information is specifically used for indicating degree of impact on the first terminal device by interference caused by the second frequency band to each frequency domain unit in the first frequency band.

In a possible implementation, the second indication information is specifically used for indicating degree of impact on the first terminal device by the interference caused by the second frequency band to a part of frequency domain resources in the first frequency band.

In a possible implementation, the capability of the first terminal device to receive the signal through the first frequency band is represented by a sensitivity value of the first terminal device to receive the signal through the first frequency band, and/or the degree of the impact is represented by an impact level corresponding to the degree of the impact.

In a possible implementation, determining, by the second network device, the time-frequency resource for transmitting the signal of the first terminal device in the first frequency band according to the second indication information, includes: determining, by the second network device, that the interference caused by the second frequency band to the first frequency band has no impact on the first terminal device according to the second indication information; and determining, by the second network device, all time-frequency resources in the first frequency band as time-frequency resources of the first terminal device.

In a possible implementation, the first frequency band is an NR carrier and the second frequency band is an LTE carrier or an NR carrier.

In a possible implementation, a cell corresponding to the second frequency band is a primary cell.

In a fourth aspect, there is provided a method for transmitting a signal, and the method comprises: sending, by a first terminal device, second indication information to a second network device, wherein the second indication information is used for indicating at least one of a capability of the first terminal device to receive a signal through a first frequency band or interference information of interference caused by a second frequency band to a first frequency band.

In a possible implementation, the second frequency band is used for transmitting an uplink signal.

In a possible implementation, the interference information includes at least one of degree of impact on the first terminal device by the interference caused by the second frequency band to the first frequency band, or an interference type of the interference caused by the second frequency band to the first frequency band, wherein the interference type includes at least one of harmonic interference or intermodulation interference.

In a possible implementation, the second indication information is specifically used for indicating degree of impact on the first terminal device by interference caused by the second frequency band to each frequency domain unit in the first frequency band.

In a possible implementation, the second indication information is specifically used for indicating degree of impact on the first terminal device by the interference caused by the second frequency band to part of frequency domain resources in the first frequency band.

In a possible implementation, the capability of the first terminal device to receive the signal through the first frequency band is represented by a sensitivity value of the first terminal device to receive the signal through the first frequency band, and/or the degree of the impact is represented by an impact level corresponding to the degree of the impact.

In a possible implementation, the first frequency band is an NR carrier and the second frequency band is an LTE carrier or an NR carrier.

In a possible implementation, a cell corresponding to the second frequency band is a primary cell.

In a possible implementation, sending, by the first terminal device, second indication information to the second network device, includes: sending, by the first terminal device, a first message to the second network device, wherein the first message carries an access capability of the first terminal device and the second indication information; or sending, by the first terminal device, the second indication information to the second network device when enabling carrier aggregation; or sending, by the first terminal device, the second indication information to the second network device when determining that a plurality of frequency bands configured for the first terminal device are capable of generating interference.

In a fifth aspect, there is provided a network device used for performing the method in the above first aspect or any possible implementation of the first aspect. The network device includes units for performing the method in the above first aspect or any possible implementation of the first aspect.

In a sixth aspect, there is provided a network device used for performing the method in the above second aspect or any possible implementation mode of the second aspect. The network device includes units used for performing the method in the above second aspect or any possible implementation mode of the second aspect.

In a seventh aspect, there is provided a network device used for performing the method in the above third aspect or any possible implementation of the third aspect. The network device includes units used for performing the method in the third aspect or any possible implementation of the above third aspect.

In an eighth aspect, there is provided a terminal device used for performing the method in the above fourth aspect or any possible implementation of the fourth aspect. The terminal device includes units for performing the method of above fourth aspect or in any possible implementation of the above fourth aspect.

In a ninth aspect, there is provided a network device. The network device includes a memory, a processor, an input interface, and an output interface. The memory, the processor, the input interface and the output interface are connected through a bus system. The memory is used for storing instructions, and the processor is used for executing the instructions stored in the memory to perform the method in the above first aspect or any possible implementation of the first aspect.

In a tenth aspect, there is provided a network device. The network device includes a memory, a processor, an input interface, and an output interface. The memory, the processor, the input interface and the output interface are connected through a bus system. The memory is used for storing instructions, and the processor is used for executing the instructions stored in the memory to perform the method in the above second aspect or any possible implementation of the second aspect.

In a eleventh aspect, there is provided a network device. The network device includes a memory, a processor, an input interface, and an output interface. The memory, the processor, the input interface and the output interface are connected through a bus system. The memory is used for storing instructions, and the processor is used for executing the instructions stored in the memory to perform the method in the above third aspect or any possible implementation of the third aspect.

In a twelfth aspect, there is provided a terminal device. The terminal device includes a memory, a processor, an input interface, and an output interface. The memory, the processor, the input interface and the output interface are connected through a bus system. The memory is used for storing instructions, and the processor is used for executing the instructions stored in the memory to perform the method in the above fourth aspect or any possible implementation of the fourth aspect.

In a thirteenth aspect, there is provided a computer storage medium used for storing computer software instructions for executing the method in the above first aspect or any possible implementation of the first aspect, or the method in the above second aspect or any possible implementation of the second aspect, or the method in the above third aspect or any possible implementation of the third aspect, or the method in the above fourth aspect or any possible implementation of the fourth aspect, and the computer software instructions include programs designed for executing the above aspects.

In a fourteenth aspect, there is provided a computer program product. The computer program product includes instructions, and when the instructions are run on a computer, the computer is caused to perform the method of the above first aspect or any one of optional implementations of the first aspect, or the method of the above second aspect or any one of optional implementations of the second aspect, or the method of the above third aspect or any one of optional implementations of the third aspect, or the method of the above fourth aspect or any one of optional implementations of the fourth aspect.

These aspects and other aspects of the present disclosure will be more simply understood in following description of implementations.

DETAILED DESCRIPTION

Figure 1:
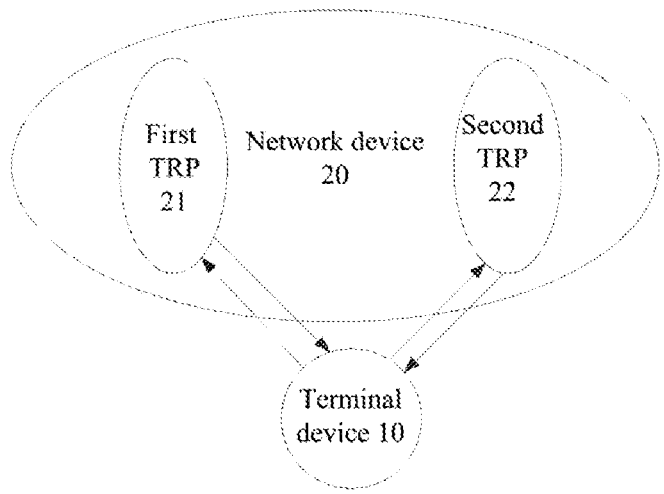
FIG. 1 is a specific application scenario according to an implementation of the present disclosure.

Technical schemes in implementations of the present disclosure will be clearly and completely described below with reference to the accompanying drawings in the implementations of the present disclosure.

It should be understood that technical solutions of implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, a New Radio (NR) system, or a future 5G system.

The technical solutions of the implementations of the present disclosure may be applied to various communication systems based on non-orthogonal multiple access technologies, such as a Sparse Code Multiple Access (SCMA) system, and a Low Density Signature (LDS) system. Of course, the SCMA system and the LDS system may also be referred to as other names in the communication field. Further, the technical solutions of the implementations of the present disclosure may be applied to multi-carrier transmission systems employing non-orthogonal multiple access technologies, such as an Orthogonal Frequency Division Multiplexing (OFDM) system based on the non-orthogonal multiple access technology, a Filter Bank Multi-Carrier (FBMC) system, a Generalized Frequency Division Multiplexing (GFDM) system, and a Filtered OFDM (F-OFDM) system.

The terminal device in the implementations of the present disclosure may be referred to a user equipment (UE), access terminal, subscriber unit, subscriber station, mobile station, mobile platform, remote station, remote terminal, mobile equipment, user terminal, terminal, wireless communication equipment, user agent or user apparatus. An access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device, a terminal device in a future 5G network, or a terminal device in a future evolved Public Land Mobile Network (PLMN), etc., which is not restricted in implementations of the present disclosure.

The network device in the implementations of the present disclosure may be a device for communicating with the terminal device, the network device may be a Base Transceiver Station (BTS) in a GSM system or CDMA system, or may be a NodeB (NB) in a WCDMA system, or may be an evolution NodeB (eNB or eNodeB) in an LTE system, or may be a wireless controller in a scenario of a Cloud Radio Access Network (CRAN), or the network device may be a relay station, an access point, an on-board device, or a wearable device, a network device in the future 5G network or a network device in the future evolved Public Land Mobile Network (PLMN), etc., which is not restricted in the implementations of the present disclosure.

A network in the NR/5G system is different from that in the traditional LTE system. The 5G system has multiple frequencies (high and low frequencies and unlicensed frequency bands) and multiple-layer overlap (such as Macro cell +Micro cell). When multiple connections are realized, connections from the UEs to the networks come from multiple network nodes under multiple frequencies. As shown in FIG. 1, a communication system in FIG. 1 may include a terminal device 10 and a network device 20, and the network device 20 includes a first TRP 21 and a second TRP 22. The network device 20 is configured to provide communication services for the terminal device 10 and access to a core network. The terminal device 10 accesses the network by searching for a synchronization signal, or a broadcast signal, etc., transmitted by the network device 20 to communicate with the network. Arrows shown in FIG. 1 may represent uplink/downlink transmission through cellular links between the terminal device 10 and the network device 20.

Taking a non-independent work mode as an example, a UE supports both LTE transmission and NR transmission, i.e., an LTE link and an NR link work simultaneously.

However, due to frequency bands of an LTE carrier and an NR carrier, there may be some harmonic or intermodulation interference in the LTE transmission and NR transmission which are performed simultaneously, thereby reducing sensitivity of a receiver.

Those skilled in the art should understand that the harmonic interference may refer to interference caused when an integer multiple of one frequency band is partly overlapped with another frequency band, and the two frequency bands perform transmission in different directions simultaneously. The harmonic interference may refer to interference caused when a linear combination of two frequency bands is partly overlapped with another frequency band, and two frequency bands and the other frequency band perform transmission in different directions simultaneously.

For example, a frequency band rang of an uplink carrier of the LTE is 1710-1785 MHz, and a range of its second harmonic is 3420-3570 MHz, which is partly overlapped with a frequency band range of downlink carrier with 3400-3800 MHz of the NR. If the uplink carrier of the LTE and the downlink carrier of the NR perform transmission simultaneously, harmonic interference will exist.

For another example, a UE is configured with an LTE carrier of Band 1 and Band 7 simultaneously, and a frequency band range of an NR carrier is 3400-3800 MHz. If an uplink of Band 7 and an uplink of NR perform transmission simultaneously, the generated intermodulation interference of 5th order will affect sensitivity of a downlink receiver on the Band 1.

Similarly, the above problems also exist in the independent work mode.

Implementation of the present disclosure provides a solution for the above problems, and the technical solution provided by implementations of the present disclosure will be described in detail below with reference to the accompanying drawings.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
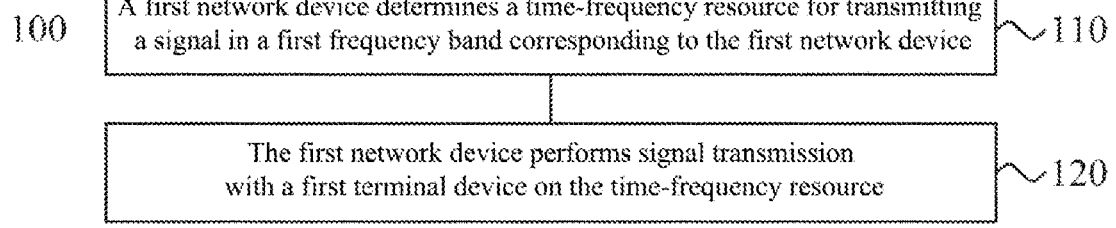
FIG. 2 is a schematic flowchart of a method for transmitting a signal according to an implementation of the present disclosure.

FIG. 2 is a schematic flowchart of a method 100 for transmitting a signal according to an implementation of the present disclosure. As shown in FIG. 2, the method 100 includes acts S110 and S120.

In S110, a first network device determines a time-frequency resource for transmitting a signal in a first frequency band corresponding to the first network device.

In S120, the first network device performs signal transmission with the first terminal device on the time-frequency resource.

The following points need to be explained.

First, a frequency band refers to a part of radio spectrum located between specific frequency boundaries. Generally speaking, the frequency band refers to a frequency range between a highest frequency and a lowest frequency on which a signal is allowed to be transmitted. Here, it refers to a frequency resource with a certain width in frequency domain, and may not be restricted in time domain. For example, the frequency band may be a carrier.

Second, a network device may be a network node, which refers to a device connected to a network with independent address and functions of sending or receiving data. A Node may be a workstation, a customer, a network user or a personal computer, a server, a printer, or other devices connected with the network. Every workstation, server, terminal device and network device, equipment with its own unique network address are all network nodes. In other words, a network device may refer to a device that is capable of providing network services physically, or a device that is capable of providing network services logically. For example, the network device may be any of the above network devices, or the network device may be a TRP.

Third, the first frequency band corresponding to the first network device means that the first frequency band is configured for the first network device to transmit a signal, the first frequency band may be used by the first network device to transmit a signal of the first network device to the terminal device, or may be used by the first network device to receive a signal transmitted from the terminal device. It should be understood that the corresponding here may be a corresponding relationship, or may be specified in a protocol, or may be negotiated between network devices, or may be configured by a primary network device to a secondary network device.

Fourth, the signal transmission with the first terminal device here may refer to the first network device sending a signal, i.e., a downlink signal to the first terminal device, or the first network device receiving a signal, i.e., an uplink signal, sent from the first terminal device.

Fifth, in the implementation of the present disclosure, on the one hand, the first network device determines the time-frequency resource for transmitting the signal in the first frequency band corresponding to the first network device, which may be determined through negotiation between the network devices. For example, a network device may notify neighboring network devices of the frequency band allocated to it before transmitting the signal, then the network device may consider whether a frequency band configured for other network devices causes interference when transmitting signals simultaneously therewith, and if so, the network device may notify other network devices causing interference to the network device, and negotiate which of the two imposes certain restrictions on its own frequency band resource. On the other hand, the first network device determines the time-frequency resource for transmitting the signal in the first frequency band corresponding to the first network device, or the time-frequency resource for transmitting the signal in the first frequency band corresponding to the first network device may be determined by other network devices and indicated to the first network device. That is, other network devices further divide the first frequency band configured for the first network device according to a certain rule.

Figure 3:
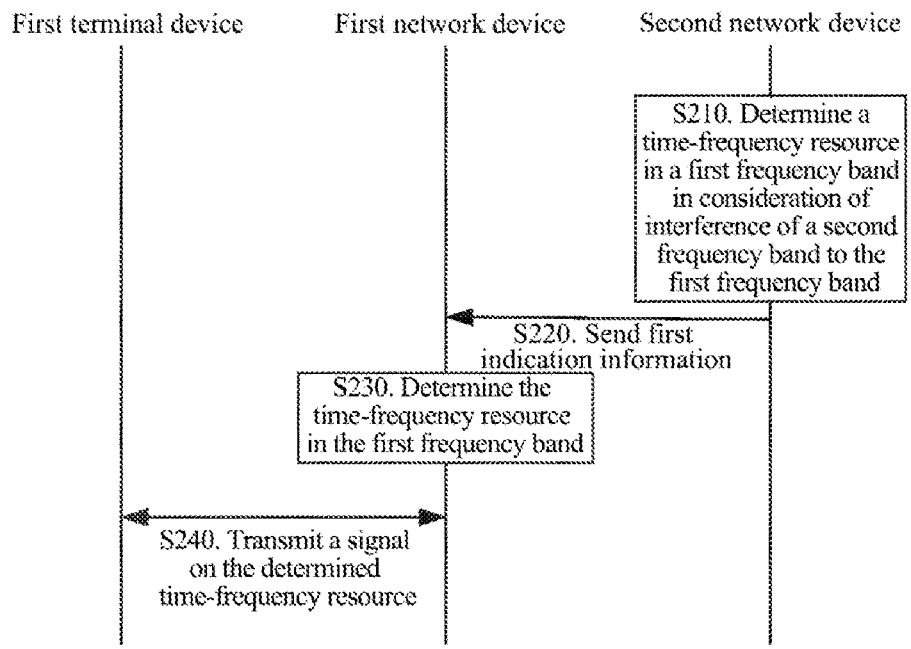
FIG. 3 is a schematic flowchart of a method for transmitting a signal according to an implementation of the present disclosure.

FIG. 3 is a simple flowchart of a method 200 for transmitting a signal according to an implementation of the present disclosure. As shown in FIG. 3, the method 200 includes acts S210-S240.

In S210, a second network device determines a time-frequency resource in a first frequency band according to interference of a second frequency band to the first frequency band.

In S220, the second network device sends first indication information to the first network device, and informs the first network device the time-frequency resource determined for the first network device.

In S230, the first network device determines the time-frequency resource in the first frequency band according to the first indication information sent from the second network device.

In S240, the first network device performs signal transmission with the first terminal device through the time-frequency resource determined for the first network device.

The second network device may determine the time-frequency resource for transmitting the signal in the first frequency band in consideration of the interference caused by the second frequency band to the first frequency band. Here, the second frequency band may be configured for the first network device, or may be configured for other network devices, such as the second network device, while the first frequency band is configured for the first network device. It should be understood that the act S210 is an optional act, that is, the second network device may make a decision without considering the interference caused by the second frequency band to the first frequency band, and may directly notify the first network device of relevant information of the second frequency band causing interference to the first frequency band, for example, its frequency band range or time domain range, etc. Further, after receiving the first indication information, determining, by the first network device, the time-frequency resource in the first frequency band according to the indication information may include: if the second network device has made a decision in consideration of the interference of the second frequency band to the first frequency band, the first indication information may indicate the time-frequency resource determined by the second network device, and the first network device may directly determine the time-frequency resource according to the first indication information. However, if the second network device does not make a decision in consideration of the interference of the second frequency band to the first frequency band, and the first indication information sent by the second network device may be relevant information of the second frequency band, then the first network device determines the time-frequency resource by itself according to the relevant information of the second frequency band indicated by the first indication information and in combination with a certain rule. After determining the time-frequency resource, the first network device may perform the signal transmission with a terminal device under the first network device through the time-frequency resource. Regardless of whether the time-frequency resource is determined by the first network device or the second network device, the interference of the second frequency band to the first frequency band is fully considered, thus when the second frequency band and the first frequency band perform transmission simultaneously, it is beneficial to reducing the interference and improving the transmission reliability.

In an implementation of the present disclosure, the first frequency band is used for transmitting a downlink signal and the second frequency band is used for transmitting an uplink signal; or the first frequency band is used for transmitting an uplink signal and the second frequency band is used for transmitting a downlink signal.

That is, transmission on the first frequency band and transmission on the second frequency band which are performed simultaneously may be in different directions. For example, transmission on a downlink of the first frequency band and transmission on an uplink of the second frequency band are performed simultaneously, or transmission on an uplink of the first frequency band and transmission on a downlink of the second frequency band are performed simultaneously. The transmission on the first frequency band and the transmission on the second frequency band which are performed simultaneously may also be in the same direction. For example, transmission on the uplink of the first frequency band and transmission on the uplink of the second frequency band are performed simultaneously, or transmission on the downlink of the first frequency band and transmission on the downlink of the second frequency band are performed simultaneously. It should be understood that the first frequency band and the second frequency band may be configured for the same network device, and the transmission on the first frequency band and the transmission on the second frequency band which are performed simultaneously may be signal transmission performed by the same network device and the same terminal device through the first frequency band and the second frequency band respectively. The first frequency band and the second frequency band may be configured for the same network device, and the transmission on the first frequency band and the transmission on the second frequency band which are performed simultaneously may be signal transmission performed by the same network device with different terminal devices through the first frequency band and the second frequency band respectively. The first frequency band and the second frequency band may be configured for different network devices, and the transmission on the first frequency band and the transmission on the second frequency band may be signal transmission performed by different network devices with terminal devices under the network devices respectively through the first frequency band and the second frequency band.

It should also be understood that, if the first frequency band and the second frequency band are configured for the same network device, there may be no explicit interaction information between a cell to which the first frequency band belongs and a cell to which the second frequency band belongs, interaction is performed through logical network elements to which the cells belong respectively.

In an implementation of the present disclosure, the first indication information is used for indicating a scheduling mode of each time domain unit within a first period in the first frequency band for the first network device, and/or the first indication information is used for indicating a scheduling mode of each frequency domain unit in the first frequency band for the first network device. Determining, by the first network device, the time-frequency resource according to the first indication information, includes: the first network device determines the time-frequency resource according to at least one of the scheduling mode of each time domain unit or the scheduling mode of each frequency domain unit.

Further, the scheduling mode may be a scheduling mode which includes allowing scheduling, prohibiting scheduling, or scheduling by using an adjusted or restricted level of a coding and modulation scheme, or the scheduling mode may be a scheduling mode which restricts the quantity of terminal devices scheduled on a specific time domain unit or a specific frequency domain unit, etc.

It should be noted that the above period and the quantity of the time domain units may be negotiated between the network devices in advance or configured by a primary network device. For example, a period of 10 time slots may be specified in advance, and the time domain unit may be one time slot, or may be an integer multiple of the time slot, etc. Each time domain unit may be equal or unequal. For example, the first time domain unit may be one time slot, and the second time domain unit may be two time slots. The quantity of frequency domain units divided on the first frequency band and a size of the frequency domain unit may be negotiated between the network devices in advance or configured by a primary network device. For example, it may be specified in advance that the first frequency band is divided by 15 kHz, and the frequency domain unit is 15 kHz, or an integer multiple of 15 kHz. Each frequency domain unit may or may not be equal, for example, the first frequency domain unit may be 15 kHz and the second frequency domain unit may be 30 kHz.

The first indication information may be a bit map defined broadly. For example, x0 may be used for representing that the time domain unit may be used for transmitting a signal, x1 represents that the time domain unit is prohibited to be used for transmitting a signal, x2 . . . xn may represent that the time domain unit may be used for transmitting a signal only with a certain restriction, etc. Where x2 . . . xn represent different restrictions, for example, adjusting or restricting a level of a Modulation and Coding Scheme (MCS).

Similarly, each frequency domain unit in the first frequency band may be indicated by a bit map defined broadly. For example, x0 may represent that the frequency domain unit may be used for transmitting a signal, x1 represents that the frequency domain unit is prohibited to be used for transmitting a signal, x2 . . . xn represent that the frequency domain unit may be used for transmitting a signal only with a certain restriction, etc. Where x2 . . . xn represent different restrictions, for example, adjusting or restricting an MCS level.

Figure 4:
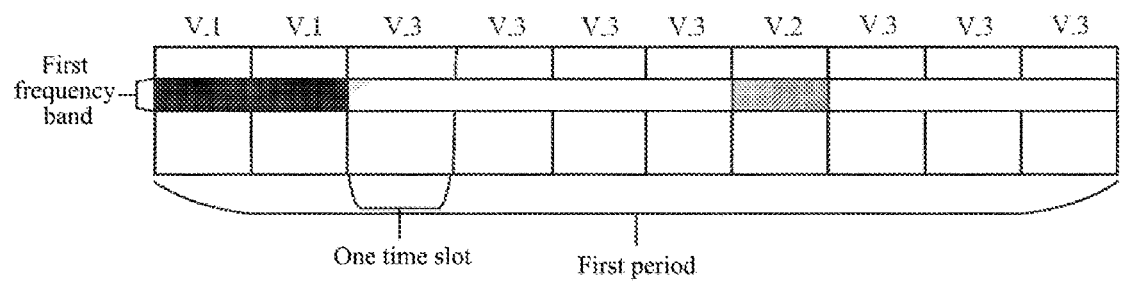
FIG. 4 is a schematic block diagram of an indication mode according to an implementation of the present disclosure.

Example 1: as shown in FIG. 4, a period consists of 10 time slots, which are indicated by a generalized bitmap of 10 bits, each position indicates information x, x is a certain value in an optional set {v_1, . . . , v_k}, different values identify different meanings. For example, v_1 represents no scheduling, v_2 represents restricting or adjusting an MCS level, and v_3 represents normal scheduling.

Figure 5:
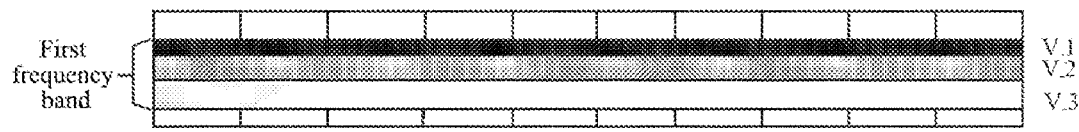
FIG. 5 is another schematic block diagram of an indication mode according to an implementation of the present disclosure.

Example 2: As shown in FIG. 5, a frequency domain resource of a certain carrier is divided into N groups according to a certain rule, which are indicated by a bit map of N bits, each position indicates information x, x is a certain value in an optional set {v_1, . . . , v_k}, and different values identify different meanings. For example, v_1 represents no scheduling, v_2 represents restricting or adjusting an MCS, and v_3 represents normal scheduling.

The MCS is used for numbering different modulation and coding modes, so that different communication strategies are called in the system, and values of the MCS correspond to communication environments with different rates. A range of values of MCS is usually [0, 31], but for newly transmitted data, values of MCS of [0, 28] may only be used. The higher the MCS, the better the dependent channel condition needs to be. Different values of the MCS correspond to various modulation orders and coding rates, and the MCS may be adjusted through a Channel Quality Indicator (CQI), a channel Signal to Noise Ratio (SNR) and the like, fed back by a user. If the second network device determines that impact of interference caused by the second frequency on a certain time domain unit or a certain frequency domain unit in the first frequency band is relatively small, the second network device may indicate the first network device to adjust or restrict an MCS level to improve the transmission reliability.

Similarly, when the second network device determines that impact of the interference caused by the second frequency on a certain time domain unit or a certain frequency domain unit in the first frequency band is relatively small, the second network device may indicate the first network device to restrict the quantity of terminal devices scheduled on the time domain unit or the frequency domain to improve the transmission reliability.

As mentioned above, the interference caused by the second frequency band to the first frequency band may be at least one of harmonic interference or intermodulation interference. If there is one second frequency band, the interference caused by the second frequency band to the first frequency band may be harmonic interference, while if there are multiple second frequency bands, the interference caused by the second frequency band to the first frequency band may be intermodulation interference.

The interference may be reduced and the transmission reliability may be improved by staggering resources in the first frequency band with the resources in the second frequency band in the time domain or in the frequency domain.

In an implementation of the present disclosure, the first indication information is used for indicating at least two kinds of information of: a starting position in time domain, a length in time domain, and an ending position in time domain of the time-frequency resource; and/or the first indication information is used for indicating at least two kinds of information of: a starting position in frequency domain, a bandwidth, and an ending position in frequency domain of the time-frequency resource.

The first indication information may be used for indicating at least two kinds of information of: a starting position in time domain, a length in time domain, and an ending position in time domain of a restricted time-frequency resource in the first frequency band, and/or the first indication information may be used for indicating at least two kinds of information of: a starting position in frequency domain, a bandwidth, and an ending position in frequency domain of a restricted time-frequency resource in the first frequency band, thus the first network device may determine a time-frequency resource allowed to be scheduled according to the restricted time-frequency resource indicated in the first indication information.

Taking FIG. 4 as an example, the second network device may directly inform the first network device through the first indication information that the last 8 slots in a period may be used for scheduling, thus the first network device may directly perform signal transmission on the last eight slots. Or, the second network device may directly inform the first network device through the first indication information that the first two time slots within a period may not be used for scheduling, then the first network device may calculate that resources that may be used for scheduling are the last eight time slots if a period of 10 time slots is agreed in advance. Taking FIG. 5 as an example, the second network device may directly inform the first network device through the first indication information that the last three frequency domain units of the first frequency band may be used for scheduling, thus the first network device may directly perform signal transmission on the last three frequency domain units of the first frequency band. Or, the second network device may directly inform the first network device through the first indication information that the first two frequency domain units of the first network device may not be used for scheduling. If it is agreed in advance that the first frequency band is divided into five frequency domain units, then the first network device may calculate that resources that may be scheduled are resources on the last three frequency domain units of the first frequency band that may be used for scheduling.

In an implementation of the present disclosure, the first indication information is used for indicating time domain configuration information of an uplink and downlink frequency band corresponding to a second network device within a second period, the uplink and downlink frequency band includes the second frequency band causing interference to the first frequency band. Determining, by the first network device, the time-frequency resource according to the first indication information, includes: the first network device determines the time-frequency resource according to the time domain configuration information.

In the implementation, the period is similar to that described above, which may be agreed or configured in advance. Generally, a part of the frequency band configured for the network device is used for transmitting an uplink signal, and the other part is used for transmitting a downlink signal, that is, the frequency band configured for network device includes an uplink frequency band and a downlink frequency band. The uplink frequency band may be the same as the downlink frequency band, but staggered in the time domain, and this is so-called time-division multiplexing. As long as the first network device obtain time domain configuration information of a frequency band corresponding to other network devices, that is, an uplink and downlink configuration condition within a period, the first network device may automatically determine a time domain resource that may be scheduling in the first frequency band or a time domain resource of which scheduling is restricted according to a certain rule, on the basis of the uplink and downlink configuration condition.

In an implementation of the present disclosure, determining, by the first network device, the time-frequency resource according to the time domain configuration information, includes: the first network device determines a resource of the first frequency band within the second period except time-domain units overlapping with the second frequency band within the second period as the time-frequency resource.

For example, a period includes 5 symbols, an uplink and downlink frequency band of the second network device is configured to be up, up, down, down and down from the first to the fifth symbols respectively, an uplink and downlink frequency band of the first network device is configured to be up, up, down, down and up. After obtaining time domain configuration information of the uplink and downlink frequency band of the second network device, the first network device may directly perform the uplink transmission on the first two symbols and does not perform uplink transmission on the fifth symbol.

As mentioned above, the first frequency band and the second frequency band may be carriers. The first frequency band may be an NR carrier, and/or the second frequency band may be an LTE carrier or an NR carrier. Both first frequency band and the second frequency band may be LTE carriers, and implementations of the present disclosure are not restricted thereto.

In addition, in an implementation of the present disclosure, the second network device may be a primary network device in a multi-connectivity scenario or a separate logical device, and the first network device may be a secondary network device in the multi-connectivity scenario. Or, in an implementation of the present disclosure, the second frequency band may be a primary carrier in carrier aggregation, and the first frequency band may be a secondary carrier in the carrier aggregation.

In an implementation of the present disclosure, the method further includes: the first network device receives terminal configuration information of the first terminal device. Determining, by the first network device, the time-frequency resource for transmitting the signal in the first frequency band corresponding to the first network device, includes: the first network device determines the time-frequency resource corresponding to the first terminal device according to the terminal configuration information.

Different terminal devices under the first network device may correspond to different configuration modes in the first frequency band, or different groups of terminal devices may correspond to different configuration modes in the first frequency band. The second network device may send identification of the first terminal device or a group number to which the first terminal device belongs to the first network device when sending the first indication information to the first network device, so that the first network device may know that the time-frequency resource indicated by the first indication information may be used for transmitting the signal of the first terminal device. Or, the above corresponding relationship may be stored between the network devices, and other network devices only need inform the first network device of the identification of the first terminal device or the group number to which the first terminal device belongs.

In other words, the time-frequency resource determined by the first network device may be applicable to all terminal devices under the first network device, may be only applicable to a certain terminal device under the first network device, or may be applicable to a certain group of terminal devices under the first network device. It should be understood that grouping of terminal devices under the first network device may be performed by the second network device, and the corresponding relationship may also be determined by the second network device.

The method further includes: the second network device receives second indication information sent from the first terminal device, wherein the second indication information is used for indicating at least one of a capability of the first terminal device to receive a signal through the first frequency band, or interference information of interference caused by the second frequency band to the first frequency band. Sending, by the second network device, the first indication information to the first network device according to the interference caused by the second frequency band to the first frequency band, includes: determining the time-frequency resource of the first terminal device according to the interference information; and sending the first indication information to the first network device.

Interference caused by different terminal devices to different frequency bands has different degree of impacts on different terminal devices, or capabilities of different terminal devices to receive signals may be different. The terminal device may report relevant information which is used for indicating degree of mutual interference caused by simultaneous transmission of different frequency bands. A reception sensitivity value, reception impact level, etc., of the terminal device may be reduced. The reception impact level may be fixed in a protocol in advance.

In other words, the second network device may obtain the above information of multiple terminal devices under the first network device in advance, such as at least one of a capability to receive a signal through the first frequency band or interference information of interference caused by the second frequency band to the first frequency band, and perform different configuration on resources of the first frequency band according to information reported by each terminal device, and may store configuration modes corresponding to different terminals. The second network device may send a corresponding relationship to the first network device, so that, when receiving identification of a certain terminal device, the first network device may know a time-frequency resource configured in the first frequency band corresponding to the terminal device by looking up a table.

It should be understood that the above first terminal device is a certain terminal device under the first network device, or the first terminal device may be a certain terminal device under the second network device. In other words, the second network device may determine a configuration mode of a frequency band corresponding to a certain terminal device scheduled by itself according to relevant information of the terminal device, and may further perform signal transmission with the terminal device according to the configuration condition.

According to isolation degree of different terminal devices to interference, the time-frequency resource for the terminal device is determined, by which performance of the terminal device may be fully utilized, thus it is beneficial to improving the transmission reliability.

The interference information includes at least one of degree of impact on the first terminal device by the interference caused by the second frequency band to the first frequency band, or an interference type of the interference caused by the second frequency band to the first frequency band, wherein the interference type includes at least one of harmonic interference or intermodulation interference. The capability of the first terminal device to receive the signal through the first frequency band is represented by a sensitivity value of the first terminal device to receive the signal through the first frequency band, and/or the degree of the impact is represented by an impact level corresponding to the degree of the impact.

Further, the first terminal device may indicate the degree of the impact through the above bit map defined broadly. The second indication information may be used for indicating degree of impact on the first terminal device by interference caused by the second frequency band to each frequency domain unit in the first frequency band.

The second indication information may be used for indicating degree of impact on the first terminal device by interference caused by the second frequency band to a part of frequency resources in the first frequency band. For example, degree of impact by a range of a certain frequency domain resource in the first frequency band may be directly indicated to the first network device, and the range of the frequency domain resource may adopt the above direct indication mode, such as at least two kinds of information of: a starting position in frequency domain, a bandwidth and an ending position in frequency domain.

Characterization modes of the degree of the impact in the implementations of the present disclosure will be specified in detail through two examples.

Example 3: a certain frequency band is divided into 5 groups, the UE will report for different groups [No Impact, No Impact, No Impact, Impact Level I, Impact Level III].

Example 4: a certain frequency band is divided into 5 groups, then the UE will report [Group 4 Impact Level I] [Group 5 Impact Level III], and groups of no impact may not need to be reported.

Or, the second network device may make harmonic interference corresponding to a configuration mode of a time-frequency resource in the first frequency band, intermodulation interference may be made to correspond to another configuration mode of a time-frequency resource in the first frequency band, and harmonic interference plus intermodulation interference may correspond to another configuration mode of a time-frequency resource in the first frequency band. After receiving an interference type reported by the first terminal device, the second network device may obtain a corresponding configuration mode by looking up a table, and then notify the first network device of the configuration mode.

It should be understood that the above characterization modes are only schematic illustration, and the implementations of the present disclosure are not restricted thereto.

In an implementation of the present disclosure, sending, by the first terminal device, second indication information to the second network device, includes: the first terminal device sends a first message to the second network device, wherein the first message carries an access capability of the first terminal device and the second indication information; or the first terminal device sends the second indication information to the second network device when enabling carrier aggregation; or the first terminal device sends the second indication information to the second network device when determining that multiple frequency bands configured for the first terminal device are capable of generating interference.

That is, the first terminal device may report the above information to the second network device while reporting the access capability of the terminal, or the first terminal device may report the above information to the second network device under the scenario that multi-connectivity or carrier aggregation is configured, or the first terminal device may not report when multi-connectivity or carrier aggregation is configured, and report the above information to the second network device under the condition that harmonic interference and/or intermodulation interference may occur when multiple carriers perform transmission simultaneously.

In the following, the technical solutions of the present disclosure will be explained by two detailed implementations.

Example 5: If only following dual-connectivity of LTE and NR is supported in a current network: the terminal supports one carrier of the LTE and one carrier of the NR simultaneously. An uplink of the LTE works at 1710-1730 MHz (FDD mode) and the carrier of the NR works at 3400-3800 MHz (TDD mode), harmonic interference of 2nd-order suffered by a downlink of the carrier of the NR is mainly concentrated in 3420-3460 and some adjacent frequency bands (for example, 3460-3470 are also affected). If the NR is in a non-standalone working mode, an LTE cell will notify an NR cell of following information (following options or combinations):

NR is normally scheduled at 3470-3800 MHz,
NR is restricted to be scheduled at 3420-3470 MHz,
NR is restricted to be scheduled at 3420-3460 MHz and an MCS is adjusted or restricted at 3460-3470.

3400-3800 MHz may be divided into 10 groups in advance, and the LTE cell notifies the NR cell of 001111111, i.e., the NR cell is restricted to be scheduled at 3400-3480 MHz.

Example 6: If the terminal supports one carrier of LTE and one carrier of NR simultaneously, an uplink of the LTE works at 1710-1730 MHz (FDD mode) and the carrier of the NR carrier works at 3400-3800 MHz (TDD mode), a range of second harmonic interference of 2nd-order suffered by a downlink of the carrier of the NR is mainly concentrated in 3420-3460 and some adjacent frequency bands (for example, 3460-3470 are also affected).

Assuming that some optimization designs have made on a certain terminal to obtain better isolation, which has little impact on downlink reception of the NR within 3420-3470, and little impact on the receiver. Then the terminal reports information to the network to indicate that impact of harmonic interference is good and frequency domain scheduling is not restricted.

Assuming that some optimization designs have made on a certain terminal to obtain certain isolation, which has little impact on downlink reception of the NR within 3420-3470, but still has impact on the receiver. Then the terminal reports information of "interference impact level 1" to the network, which is used for indicating degree of impact of interference (assuming that there are 1, . . . , k levels in total, level 1 is the smallest level and level k is the largest level).

After the network receives the report from the UE, when scheduling the UE, the network may reasonably perform scheduling and resource allocation according to an interference and suppression capability of transmission at different frequency points of the UE.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Figure 6:
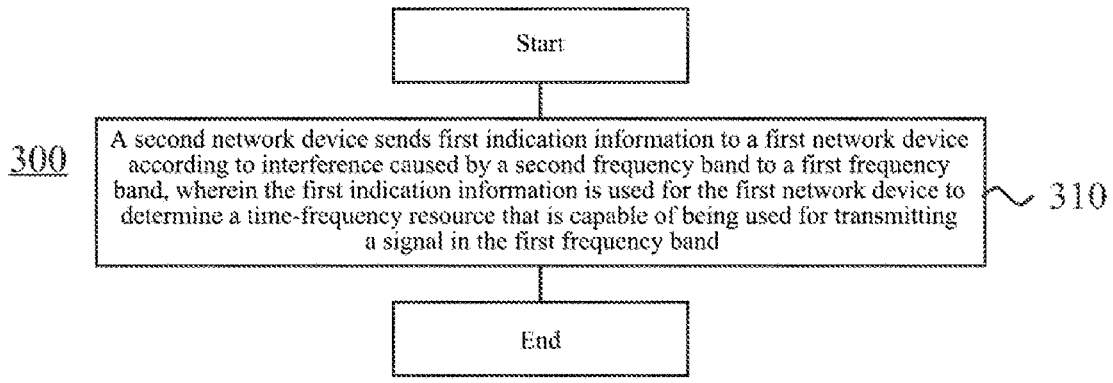
FIG. 6 is a schematic flowchart of a method for transmitting a signal according to an implementation of the present disclosure.

FIG. 6 is a schematic flowchart of a method 300 for transmitting a signal according to an implementation of the present disclosure. As shown in FIG. 6, the method 300 includes the act S310.

In S310: a second network device sends first indication information to a first network device according to interference caused by a second frequency band to a first frequency band, wherein the first indication information is used for the first network device to determine a time-frequency resource that is capable of being used for transmitting a signal in the first frequency band.

Therefore, the method for transmitting the signal in the implementation of the present disclosure is beneficial to reducing interference of transmission simultaneously performed between frequency bands, thereby improving the transmission reliability.

In an implementation of the present disclosure, the first frequency band is used for transmitting a downlink signal and the second frequency band is used for transmitting an uplink signal; or the first frequency band is used for transmitting an uplink signal and the second frequency band is used for transmitting a downlink signal.

In an implementation of the present disclosure, the first indication information is used for indicating a scheduling mode of each time domain unit within a first period in the first frequency band for the first network device, and/or the first indication information is used for indicating a scheduling mode of each frequency domain unit in the first frequency band for the first network device.

In an implementation of the present disclosure, the scheduling mode includes allowing scheduling, prohibiting scheduling, or scheduling by using an adjusted or restricted level of a coding and modulation scheme.

In an implementation of the present disclosure, the first indication information is used for indicating at least two kinds of information of: a starting position in time domain, a length in time domain, and an ending position in time domain of the time-frequency resource; and/or the first indication information is used for indicating at least two kinds of information of: a starting position in frequency domain, a bandwidth, and an ending position in frequency domain of the time-frequency resource.

In an implementation of the present disclosure, the first indication information is used for indicating time domain configuration information of an uplink and downlink frequency band corresponding to the second network device within a second period, and the uplink and downlink frequency band includes the second frequency band.

In an implementation of the present disclosure, the first indication information is used for indicating the time-frequency resource of a first terminal device, and the first terminal device is a terminal device to which the first network device provides a network service.

In an implementation of the present disclosure, the method further includes: the second network device receives second indication information sent from the first terminal device, wherein the second indication information is used for indicating at least one of a capability of the first terminal device to receive a signal through the first frequency band, or interference information of interference caused by the second frequency band to the first frequency band. Sending, by the second network device, the first indication information to the first network device according to the interference caused by the second frequency band to the first frequency band, includes: determining the time-frequency resource of the first terminal device according to the interference information; and sending the first indication information to the first network device.

In an implementation of the present disclosure, the first frequency band is an NR carrier, and the second frequency band is an LTE carrier or an NR carrier.

In an implementation of the present disclosure, a cell corresponding to the second frequency band is a primary cell.

It should be understood that the interaction and related characteristics and functions between the second network device, the first network device and the first terminal device described by the second network device correspond to the related characteristics and functions of the first network device. Moreover, the related contents have been described in detail in the above methods 100 and 200, and will not be repeated here for the sake of brevity.

It should be understood that in various implementations of the present disclosure, values of sequence numbers in the aforementioned processes do not indicate an order of execution, and the order of execution of various processes should be determined by their functions and internal logics, and should not constitute any restriction on implementation processes of implementations of the present disclosure.

Figure 7:
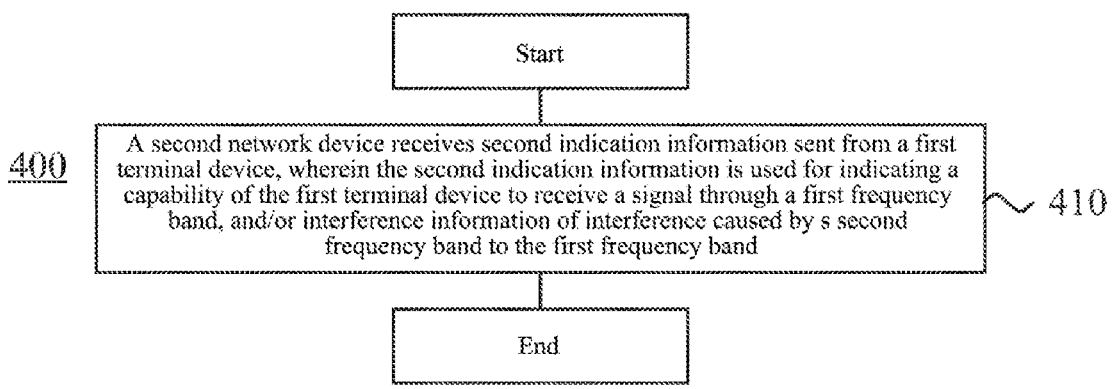
FIG. 7 is a schematic flowchart of a method for transmitting a signal according to an implementation of the present disclosure.

FIG. 7 is a schematic flowchart of a method 400 for transmitting a signal according to an implementation of the present disclosure. As shown in FIG. 7, the method 400 includes act S410.

In S410: a second network device receives second indication information sent from a first terminal device, and the second indication information is used for indicating a capability of the first terminal device to receive a signal through a first frequency band, and/or interference information of interference caused by s second frequency band to the first frequency band.

In an implementation of the present disclosure, the method 400 further includes S420.

In S420, the second network device determines a time-frequency resource for transmitting a signal of the first terminal device in the first frequency band according to the second indication information.

The first frequency band may be configured for the second network device to perform signal transmission with the first terminal device, or may be configured for other network devices, such as the first network device, to perform signal transmission with the first terminal device. In other words, after the second network device determines the time-frequency resource of the first terminal device, the second network device may directly use the time-frequency resource to perform the signal transmission with the first terminal device. The indication information indicating the time-frequency resource may be sent to other network devices, so that the other network devices may use the time-frequency resource to perform signal transmission with the first terminal device.

It should be understood that when receiving the above information reported by the first terminal device, the second network device may perform resource configuration on the terminal device with reference to the above information, or the second network device may perform resource configuration on the terminal device according to its own rules without reference to the above information, and the implementations of the present disclosure are not restricted to this.

Therefore, in the method for transmitting the signal according to the implementation of the present disclosure, the time-frequency resource is determined for the terminal device according to isolation degrees of interference for different terminal devices, which can fully utilize the performance of the terminal device, therefore, it is beneficial to improving the transmission reliability.

In an implementation of the present disclosure, the second frequency band is used for transmitting an uplink signal.

In an implementation of the present disclosure, the interference information includes at least one of degree of impact on the first terminal device by the interference caused by the second frequency band to the first frequency band, or an interference type of the interference caused by the second frequency band to the first frequency band, wherein the interference type includes at least one of harmonic interference or intermodulation interference.

In an implementation of the present disclosure, the second indication information is specifically used for indicating degree of impact on the first terminal device by interference caused by the second frequency band to each frequency domain unit in the first frequency band.

In an implementation of the present disclosure, the second indication information is specifically used for indicating degree of impact on the first terminal device by interference caused by the second frequency band to a part of frequency domain resources in the first frequency band.

In an implementation of the present disclosure, the capability of the first terminal device to receive the signal through the first frequency band is represented by a sensitivity value of the first terminal device to receive the signal through the first frequency band, and/or the degree of the impact is represented by an impact level corresponding to the degree of the impact.

In an implementation of the present disclosure, determining, by the second network device, the time-frequency resource for transmitting the signal of the first terminal device in the first frequency band according to the second indication information, includes: the second network device determines that the interference caused by the second frequency band to the first frequency band has no impact on the first terminal device according to the second indication information; and the second network device determines all time-frequency resources in the first frequency band as time-frequency resources of the first terminal device.

In an implementation of the present disclosure, the first frequency band is an NR carrier, and the second frequency band is an LTE carrier or an NR carrier.

In an implementation of the present disclosure, a cell corresponding to the second frequency band is a primary cell.

It should be understood that the interaction and related characteristics and functions between the second network device, the first network device and the first terminal device described by the second network device correspond to the related characteristics and functions of the first network device. Moreover, the related contents have been described in detail in the above methods 100 and 200, and will not be repeated here for the sake of brevity.

It should be understood that in various implementations of the present disclosure, values of sequence numbers in the aforementioned processes do not indicate an order of execution, and the order of execution of various processes should be determined by their functions and internal logics, and should not constitute any limitation on implementation processes of implementations of the present disclosure.

Figure 8:
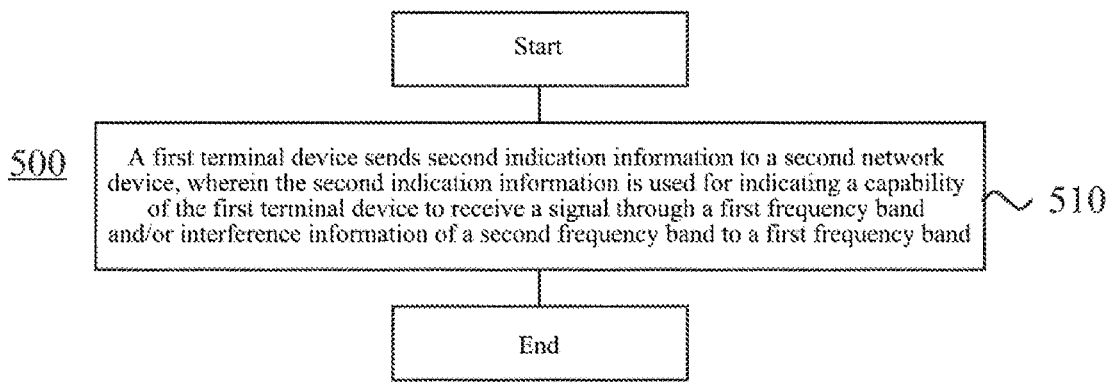
FIG. 8 is a schematic flowchart of a method for transmitting a signal according to an implementation of the present disclosure.

FIG. 8 is a schematic flowchart of a method 500 for transmitting a signal according to an implementation of the present disclosure. As shown in FIG. 8, the method 500 includes S510.

In S510, a first terminal device sends second indication information to a second network device, wherein the second indication information is used for indicating a capability of the first terminal device to receive a signal through a first frequency band and/or interference information of a second frequency band to a first frequency band.

Therefore, in the method for transmitting the signal according to the implementation of the present disclosure, the terminal device reports the isolation degree for interference to the network device, so that the network device is capable of determining the time-frequency resource for the terminal device, which can make full use of the performance of the terminal device, and is beneficial to improving the transmission reliability.

In an implementation of the present disclosure, the second frequency band is used for transmitting an uplink signal.

In an implementation of the present disclosure, the interference information includes at least one of degree of impact on the first terminal device by the interference caused by the second frequency band to the first frequency band, or an interference type of the interference caused by the second frequency band to the first frequency band, wherein the interference type includes harmonic interference and/or intermodulation interference.

In an implementation of the present disclosure, the second indication information is specifically used for indicating degree of impact on the first terminal device by interference caused by the second frequency band to each frequency domain unit in the first frequency band.

In an implementation of the present disclosure, the second indication information is specifically used for indicating degree of impact on the first terminal device by interference caused by the second frequency band to a part of frequency domain resources in the first frequency band.

In an implementation of the present disclosure, the capability of the first terminal device to receive the signal through the first frequency band is represented by a sensitivity value of the first terminal device to receive the signal through the first frequency band, and/or the degree of the impact is represented by an impact level corresponding to the degree of the impact.

In an implementation of the present disclosure, the first frequency band is an NR carrier, and the second frequency band is an LTE carrier or an NR carrier.

In an implementation of the present disclosure, a cell corresponding to the second frequency band is a primary cell.

In an implementation of the present disclosure, sending, by the first terminal device, the second indication information to the second network device, includes: the first terminal device sends a first message to the second network device, wherein the first message carries an access capability of the first terminal device and the second indication information; or the first terminal device sends the second indication information to the second network device when carrier aggregation is enabled; or the first terminal device sends the second indication information to the second network device when determining that multiple frequency bands configured for the first terminal device are capable of generating interference.

It should be understood that the interaction and related characteristics, functions, etc. between the first terminal device, the second network device and the first network device described by the first terminal device correspond to the related characteristics and functions of the first network device. Moreover, the related contents have been described in detail in the above methods 100 and 200, and will not be repeated here for the sake of brevity.

It should be understood that in various implementations of the present disclosure, values of sequence numbers in the aforementioned processes do not indicate an order of execution, and the order of execution of various processes should be determined by their functions and internal logics, and should not constitute any limitation on implementation processes of implementations of the present disclosure.

The method for transmitting the signal according to the implementations of the present disclosure have been described in detail above, and devices for transmitting a signal according to implementations of the present disclosure will be described below with reference to FIGS. 9 to 16. The technical features described in the method implementations are applicable to following device implementations.

Figure 9:
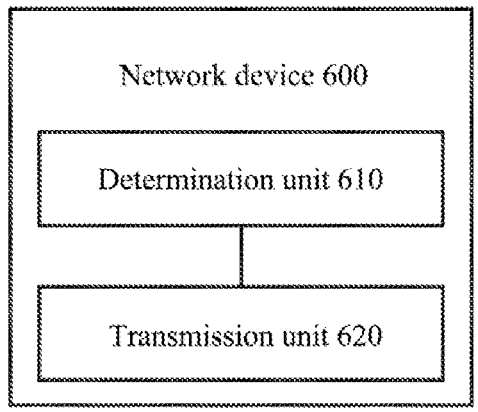
FIG. 9 is a schematic block diagram of a network device according to an implementation of the present disclosure.

FIG. 9 is a block diagram of a network device 600 according to an implementation of the present disclosure. The network device 600 is a first network device, as shown in FIG. 9, the network device 600 includes a determination unit 610 and a transmission unit 620.

The determination unit 610 is used for determining a time-frequency resource for transmitting a signal in a first frequency band corresponding to the first network device.

The transmission unit 620 is used for performing signal transmission with the first terminal device on the time-frequency resource.

Therefore, the network device provided in an implementation of the present disclosure is beneficial to reducing interference of transmission simultaneously performed between frequency bands, thereby improving the transmission reliability.

In an implementation of the present disclosure, the network device further includes a first receiving unit used for receiving first indication information. The determination unit is specifically used for determining the time-frequency resource according to the first indication information.

In an implementation of the present disclosure, the first indication information is sent based on interference caused by the second frequency band to the first frequency band.

In an implementation of the present disclosure, the first frequency band is used for transmitting a downlink signal and the second frequency band is used for transmitting an uplink signal; or the first frequency band is used for transmitting an uplink signal and the second frequency band is used for transmitting a downlink signal.

In an implementation of the present disclosure, the first indication information is used for indicating a scheduling mode of each time domain unit within a first period in the first frequency band for the first network device, and/or the first indication information is used for indicating a scheduling mode of each frequency domain unit in the first frequency band for the first network device. The determination unit 610 is specifically used for determining the time-frequency resource according to at least one of the scheduling mode of each time domain unit or the scheduling mode of each frequency domain unit.

In an implementation of the present disclosure, the scheduling mode includes allowing scheduling, prohibiting scheduling, or scheduling by using an adjusted or restricted level of a coding and modulation scheme.

In an implementation of the present disclosure, the first indication information is used for indicating at least two kinds of information of: a starting position in time domain, a length in time domain, and an ending position in time domain of the time-frequency resource; and/or the first indication information is used for indicating at least two kinds of information of: a starting position in frequency domain, a bandwidth, and an ending position in frequency domain of the time-frequency resource.

In an implementation of the present disclosure, the first indication information is used for indicating time domain configuration information of an uplink and downlink frequency band corresponding to the second network device within the second period, the uplink and downlink frequency band includes the second frequency band causing interference to the first frequency band. The determination unit 610 is specifically used for determining the time-frequency resource according to the time domain configuration information.

In an implementation of the present disclosure, the determination unit 610 is specifically used for determining a resource of the first frequency band within the second period except time domain units overlapping with the second frequency band within the second period as the time-frequency resource.

In an implementation of the present disclosure, the first frequency band is an NR carrier, and/or the second frequency band is an LTE carrier or an NR carrier.

It should be understood that, the network device 600 in the implementation of the present disclosure may correspond to the first network device in the method implementation of the present disclosure, and the above operations and other operations and/or functions of each unit in the network device 600 are respectively for implementing the corresponding flow of the network device in each method shown in FIG. 2 to FIG. 5, and will not be repeated here for brevity.

Figure 10:
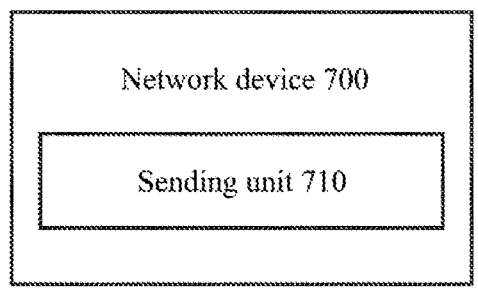
FIG. 10 is another schematic block diagram of a network device according to an implementation of the present disclosure.

FIG. 10 is a block diagram of a network device 700 according to an implementation of the present disclosure. The network device 700 is a second network device, as shown in FIG. 10, the network device 700 includes a sending unit 710.

The sending unit 710 is used for sending first indication information to a first network device according to interference caused by a second frequency band to a first frequency band, wherein the first indication information is used for the first network device to determine a time-frequency resource that is capable of being used for transmitting a signal in the first frequency band.

Therefore, the network device provided in the implementation of the present disclosure is beneficial to reducing interference of transmission simultaneously performed between frequency bands, thereby improving the transmission reliability.

In an implementation of the present disclosure, the first frequency band is used for transmitting a downlink signal and the second frequency band is used for transmitting an uplink signal; or the first frequency band is used for transmitting an uplink signal and the second frequency band is used for transmitting a downlink signal.

In an implementation of the present disclosure, the first indication information is used for indicating a scheduling mode of each time domain unit within a first period in the first frequency band for the first network device, and/or the first indication information is used for indicating a scheduling mode of each frequency domain unit in the first frequency band for the first network device.

In an implementation of the present disclosure, the scheduling mode includes allowing scheduling, prohibiting scheduling, or scheduling by using an adjusted or restricted level of a coding and modulation scheme.

In an implementation of the present disclosure, the first indication information is used for indicating at least two kinds of information of: a starting position in time domain, a length in time domain, and a ending position in time domain of the time-frequency resource; and/or the first indication information is used for indicating at least two kinds of information of: a starting position in frequency domain, a bandwidth, and an ending position in frequency domain of the time-frequency resource.

In an implementation of the present disclosure, the first indication information is used for indicating time domain configuration information of an uplink and downlink frequency band corresponding to the second network device within a second period, and the uplink and downlink frequency band includes the second frequency band.

In an implementation of the present disclosure, the first indication information is used for indicating the time-frequency resource of a first terminal device, and the first terminal device is a terminal device to which the first network device provides a network service.

In an implementation of the present disclosure, the network device 700 further includes: a receiving unit used for receiving second indication information sent by the first terminal device. The second indication information is used for indicating at least one of a capability of the first terminal device to receive a signal through the first frequency band or interference information of the second frequency band to the first frequency band. The sending unit is specifically used for determining the time-frequency resource of the first terminal device according to the interference information; sending the first indication information to the first network device.

In an implementation of the present disclosure, the interference information includes at least one of degree of impact on the first terminal device by the interference caused by the second frequency band to the first frequency band, or an interference type of the interference caused by the second frequency band to the first frequency band, wherein the interference type includes at least one of harmonic interference or intermodulation interference.

In an implementation of the present disclosure, the second indication information is specifically used for indicating degree of impact on the first terminal device by interference caused by the second frequency band to each frequency domain unit in the first frequency band.

In an implementation of the present disclosure, the first frequency band is an NR carrier, and the second frequency band is an LTE carrier or an NR carrier.

In an implementation of the present disclosure, a cell corresponding to the second frequency band is a primary cell.

It should be understood that the network device 700 in the implementation of the present disclosure may correspond to the second network device in the method implementation of the present disclosure, and the above operations and other operations and/or functions of each unit in the network device 700 are respectively for implementing the corresponding flow of the network device in the method shown in FIG. 6, and will not be repeated here for brevity.

Figure 11:
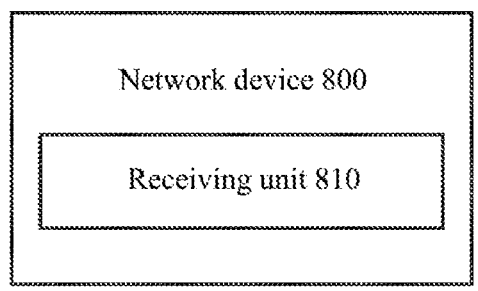
FIG. 11 is yet another schematic block diagram of a network device according to an implementation of the present disclosure.

FIG. 11 is a block diagram of a network device 800 according to an implementation of the present disclosure. The network device 800 is a second network device, as shown in FIG. 11, the network device 800 includes a receiving unit 810.

The receiving unit 810 is used for receiving second indication information sent from a first terminal device, the second indication information is used for indicating at least one of a capability of the first terminal device to receive a signal through a first frequency band, or interference information of interference caused by a second frequency band to the first frequency band.

Therefore, the network device in the implementation of the present disclosure determines the time-frequency resource for the terminal device according to the isolation degree of interference for different terminal devices, which can fully utilize the performance of the terminal device, therefore, it is beneficial to improving the transmission reliability.

In an implementation of the present disclosure, the network device 800 further includes a determination unit used for determining a time-frequency resource for transmitting a signal of the first terminal device in the first frequency band according to the second indication information.

In an implementation of the present disclosure, the second frequency band is used for transmitting an uplink signal.

In an implementation of the present disclosure, the interference information includes at least one of degree of impact on the first terminal device by the interference caused by the second frequency band to the first frequency band, or an interference type of the interference caused by the second frequency band to the first frequency band, wherein the interference type includes at least one of harmonic interference or intermodulation interference.

In an implementation of the present disclosure, the second indication information is specifically used for indicating degree of impact on the first terminal device by interference caused by the second frequency band to each frequency domain unit in the first frequency band.

In an implementation of the present disclosure, the second indication information is used for indicating degree of impact on the first terminal device by interference caused by the second frequency band to a part of frequency domain resources in the first frequency band.

In an implementation of the present disclosure, the capability of the first terminal device to receive the signal through the first frequency band is represented by a sensitivity value of the first terminal device to receive the signal through the first frequency band, and/or the degree of the impact is represented by an impact level corresponding to the degree of the impact.

In an implementation of the present disclosure, the determination unit is specifically used for determining that the interference caused by the second frequency band to the first frequency band has no impact on the first terminal device according to the second indication information; and determining all time-frequency resources in the first frequency band as time-frequency resources of the first terminal device.

In an implementation of the present disclosure, the network device 800 further includes a sending unit used for sending first indication information to the first network device, and the first indication information is used for indicating the time-frequency resource of the first terminal device.

In an implementation of the present disclosure, the first frequency band is an NR carrier, and the second frequency band is an LTE carrier or an NR carrier.

In an implementation of the present disclosure, a cell corresponding to the second frequency band is a primary cell.

It should be understood that the network device 800 in the implementation of the present disclosure may correspond to the second network device in the method implementation of the present disclosure, and the above operations and other operations and/or functions of each unit in the network device 800 are respectively for implementing the corresponding flow of the network device in the method shown in FIG. 7, and will not be repeated here for brevity.

Figure 12:
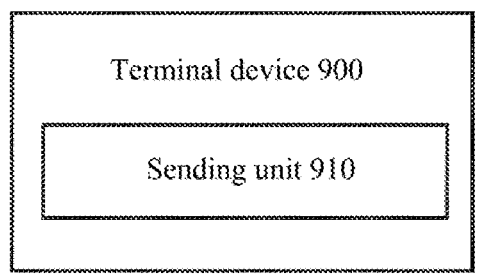
FIG. 12 is a schematic block diagram of a terminal device according to an implementation of the present disclosure.

FIG. 12 is a block diagram of a terminal device 900 according to an implementation of the present disclosure. The terminal device 900 is a first terminal device, as shown in FIG. 12, the terminal device 900 includes a sending unit 910.

The sending unit 910 is used for sending second indication information to a second network device, the second indication information is used for indicating at least one of a capability of the first terminal device to receive a signal through a first frequency band, or interference information of interference caused by a second frequency band to a first frequency band.

Therefore, the terminal device of the implementation of the present disclosure reports the isolation degree to the network device, so that the network device can determine the time-frequency resource for the terminal device, which can make full use of the performance of the terminal device, thus it is beneficial to improving the transmission reliability.

In an implementation of the present disclosure, the second frequency band is used for transmitting an uplink signal.

In an implementation of the present disclosure, the interference information includes at least one of degree of impact on the first terminal device by the interference caused by the second frequency band to the first frequency band, or an interference type of the interference caused by the second frequency band to the first frequency band, wherein the interference type includes at least one of harmonic interference or intermodulation interference.

In an implementation of the present disclosure, the second indication information is specifically used for indicating degree of impact on the first terminal device by interference caused by the second frequency band to each frequency domain unit in the first frequency band.

In an implementation of the present disclosure, the second indication information is used for indicating degree of impact on the first terminal device by interference caused by the second frequency band to a part of frequency domain resources in the first frequency band.

In an implementation of the present disclosure, the capability of the first terminal device to receive the signal through the first frequency band is represented by a sensitivity value of the first terminal device to receive the signal through the first frequency band, and/or the degree of the impact is represented by an impact level corresponding to the degree of the impact.

In an implementation of the present disclosure, the first frequency band is an NR carrier, and the second frequency band is an LTE carrier or an NR carrier.

In an implementation of the present disclosure, a cell corresponding to the second frequency band is a primary cell.

In an implementation of the present disclosure, the sending unit is specifically used for sending a first message to the second network device, wherein the first message carries an access capability of the first terminal device and the second indication information; or sending the second indication information to the second network device when enabling carrier aggregation; or sending the second indication information to the second network device when determining that multiple frequency bands configured for the first terminal device are capable of generating interference.

It should be understood that the terminal device 900 according to the implementation of the present disclosure may correspond to the terminal device in the method of the present disclosure, and the above-mentioned and other operations and/or functions of various units in the terminal device 900 are respectively for implementing the corresponding processes of the terminal device in the method shown in FIG. 8, and will not be repeated here for brevity.

Figure 13:
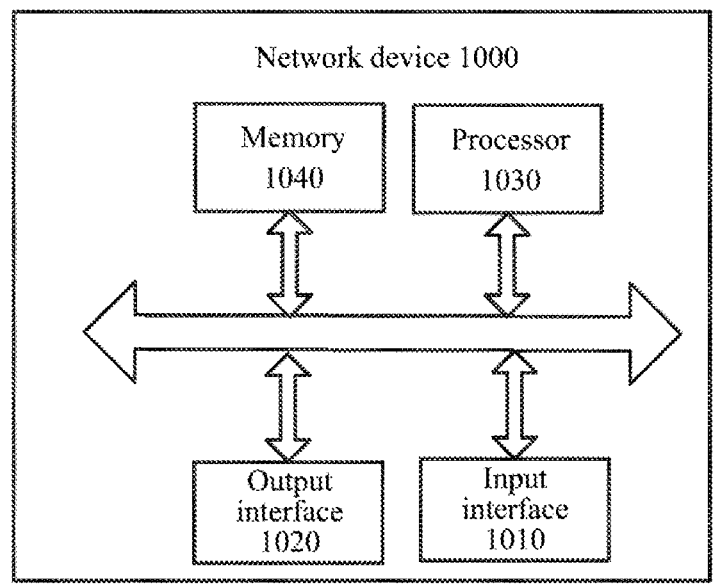
FIG. 13 is yet another schematic block diagram of a network device according to an implementation of the present disclosure.

As shown in FIG. 13, an implementation of the present disclosure provides a network device 1000. The network device 1000 may be the network device 600 in FIG. 9, and may be used for performing the contents for the first network device corresponding to the methods in FIG. 2 to FIG. 5. The network device 1000 includes an input interface 1010, an output interface 1020, a processor 1030, and a memory 1040. The input interface 1010, the output interface 1020, the processor 1030, and the memory 1040 may be connected through a bus system. The memory 1040 is used for storing programs, instructions, or codes. The processor 1030 is used for executing programs, instructions, or codes in the memory 1040 to control the input interface 1010 to receive signals, to control the output interface 1020 to send signals, and to complete the operations in the foregoing method implementations.

Therefore, the network device provided in the implementation of the present disclosure is beneficial to reducing interference of transmissions simultaneously performed between frequency bands, thereby improving the transmission reliability.

It should be understood that in the implementation of the present disclosure, the processor 1030 may be a Central Processing Unit (CPU), or the processor 1030 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 1040 may include a read only memory and a random access memory, and provide instructions and data to the processor 1030. A portion of memory 1040 may include non-volatile random access memory. For example, the memory 1040 may also store type information of a device.

In implementation processes, various acts of the methods described above may be accomplished by integrated logic circuits of hardware or instructions in the form of software in the processor 1030. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1040, and the processor 1030 reads the information in the memory 1040, and accomplishes the contents of the above method in combination with its hardware. In order to avoid repetition, it will not be described in detail here.

In a specific implementation, the receiving unit in the network device 600 may be implemented by the input interface 1010 in FIG. 13, and the determination unit 610 in the network device 600 may be implemented by the processor 1030 in FIG. 13.

Figure 14:
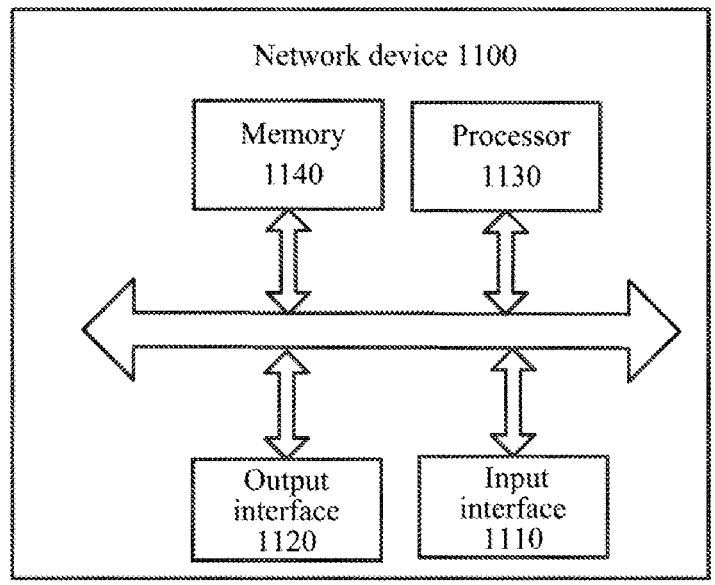
FIG. 14 is yet another schematic block diagram of a network device according to an implementation of the present disclosure.

As shown in FIG. 14, an implementation of the present disclosure provides a network device 1100. The network device 1100 may be the network device 700 in FIG. 10, and may be used for performing the contents for the second network device corresponding to the method in FIG. 6. The network device 1100 includes an input interface 1110, an output interface 1120, a processor 1130, and a memory 1140. The input interface 1110, the output interface 1120, the processor 1130, and the memory 1140 may be connected through a bus system. The memory 1140 is used for storing programs, instructions, or codes. The processor 1130 is used for executing programs, instructions, or codes in the memory 1140 to control the input interface 1110 to receive signals, to control the output interface 1120 to send signals, and to complete the operations in the foregoing method implementations.

Therefore, the network device provided in the implementation of the present disclosure is beneficial to reducing interference of transmissions simultaneously performed between frequency bands, thereby improving the transmission reliability.

It should be understood that in the implementation of the present disclosure, the processor 1130 may be a Central Processing Unit (CPU), or the processor 1130 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 1140 may include a read only memory and a random access memory, and provide instructions and data to the processor 1130. A portion of memory 1140 may include non-volatile random access memory. For example, the memory 1140 may also store type information of a device.

In implementation processes, various acts of the methods described above may be accomplished by integrated logic circuits of hardware or instructions in the form of software in the processor 1130. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1140, and the processor 1130 reads the information in the memory 1140, and accomplishes the contents of the above method in combination with its hardware. In order to avoid repetition, it will not be described in detail here.

In a specific implementation, the sending unit in the network device 700 may be implemented by the output interface 1120 in FIG. 14, and the receiving unit in the network device 700 may be implemented by the input interface 1110 in FIG. 14.

Figure 15:
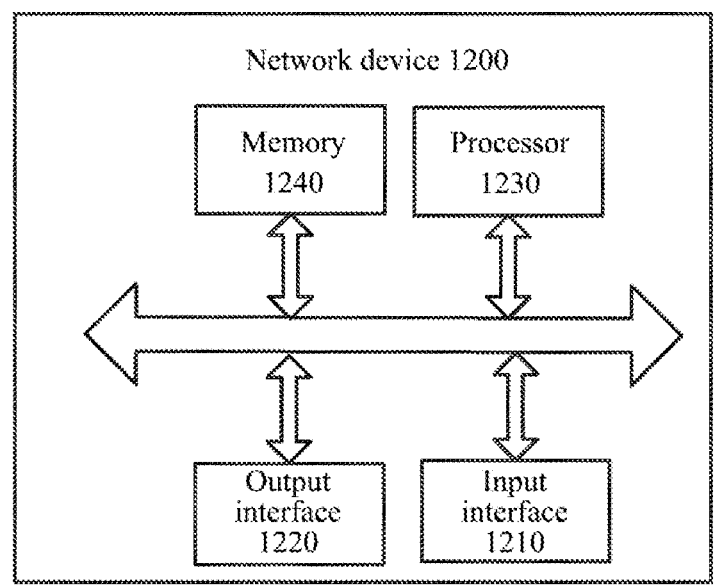
FIG. 15 is yet another schematic block diagram of a network device according to an implementation of the present disclosure.

As shown in FIG. 15, an implementation of the present disclosure provides a network device 1200. The network device 1200 may be the network device 800 in FIG. 11, and may be used for performing the contents for the second network device corresponding to the method in FIG. 7. The network device 1200 includes an input interface 1210, an output interface 1220, a processor 1230, and a memory 1240. The input interface 1210, the output interface 1220, the processor 1230, and the memory 1240 may be connected through a bus system. The memory 1240 is used for storing programs, instructions, or codes. The processor 1230 is used for executing programs, instructions, or codes in the memory 1240 to control the input interface 1210 to receive signals, to control the output interface 1220 to send signals, and to complete the operations in the foregoing method implementations.

Therefore, the network device in the implementation of the present disclosure determines the time-frequency resource for the terminal device according to the isolation degrees of interference for different terminal devices, which can fully utilize the performance of the terminal device, therefore, it is beneficial to improving the transmission reliability.

It should be understood that in the implementation of the present disclosure, the processor 1230 may be a Central Processing Unit (CPU), or the processor 1230 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 1240 may include a read only memory and a random access memory, and provide instructions and data to the processor 1230. A portion of memory 1240 may include non-volatile random access memory. For example, the memory 1240 may also store type information of a device.

In implementation processes, various acts of the methods described above may be accomplished by integrated logic circuits of hardware or instructions in the form of software in the processor 1230. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1240, and the processor 1230 reads the information in the memory 1240, and accomplishes the contents of the above method in combination with its hardware. In order to avoid repetition, it will not be described in detail here.

In a specific implementation, the determination unit in the network device 800 may be implemented by the processor 1230 in FIG. 15, and the receiving unit in the network device 800 may be implemented by the input interface 1210 in FIG. 15.

Figure 16:
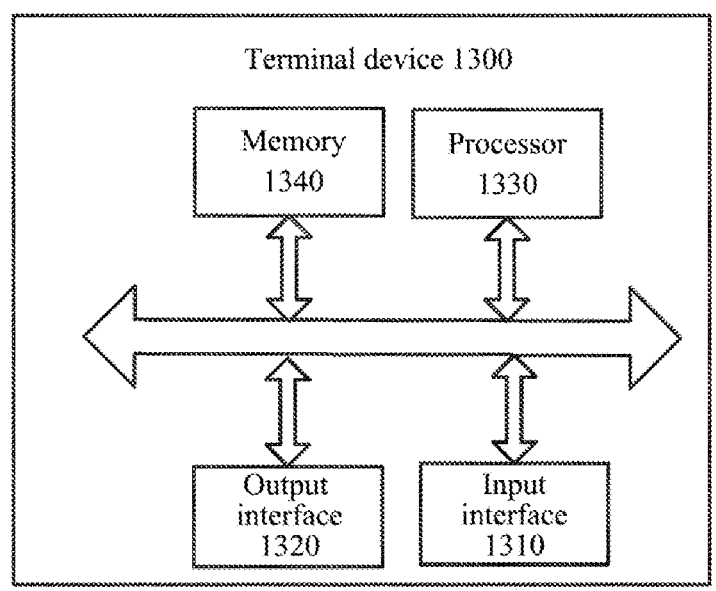
FIG. 16 is another schematic block diagram of a terminal device according to an implementation of the present disclosure.

As shown in FIG. 16, an implementation of the present disclosure provides a terminal device 1300. The terminal device 1300 may be the terminal device 900 in FIG. 12, and may be used to perform the contents for the first terminal device corresponding to the method in FIG. 8. The terminal device 1300 includes an input interface 1310, an output interface 1320, a processor 1330, and a memory 1340. The input interface 1310, the output interface 1320, the processor 1330, and the memory 1340 may be connected through a bus system. The memory 1340 is used for storing programs, instructions, or codes. The processor 1330 is used for executing programs, instructions, or codes in the memory 1340 to control the input interface 1310 to receive signals, to control the output interface 1320 to send signals, and to complete the operations in the foregoing method implementations.

Therefore, the terminal device of the implementation of the present disclosure can make the network device determine the time-frequency resource for the terminal device by reporting the isolation degree to the network device, and which can make full use of the performance of the terminal device, thus it is beneficial to improving the transmission reliability.

It should be understood that in the implementation of the present disclosure, the processor 1330 may be a Central Processing Unit (CPU), or the processor 1330 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 1340 may include a read only memory and a random access memory, and provide instructions and data to the processor 1330. A portion of memory 1340 may include non-volatile random access memory. For example, the memory 1340 may also store type information of a device.

In implementation processes, various acts of the methods described above may be accomplished by integrated logic circuits of hardware or instructions in the form of software in the processor 1330. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1340, and the processor 1330 reads the information in the memory 1340, and accomplishes the contents of the above method in combination with its hardware. In order to avoid repetition, it will not be described in detail here.

In a specific implementation, the sending unit in the terminal device 900 may be implemented by the output interface 1320 in FIG. 16.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed system, device and method may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure shall be the protection scope defined by the claims.

What is claimed is:

1. A method for transmitting a signal, comprising:
   sending, by a first terminal device, second indication information to a second network device, wherein the second indication information is used for indicating interference information of interference caused by a second frequency band to a first frequency band, wherein the interference comprises at least one of harmonic interference or intermodulation interference, wherein the first frequency band is a new radio (NR) carrier, wherein the second frequency band is a long term evolution (LTE) carrier, wherein the second indication information is used for determining first indication information sent from the second network device to a first network device, wherein the first indication information is used for indicating a scheduling mode of each frequency domain unit in the first frequency band for the first network device, wherein the scheduling mode of each frequency domain unit is used for determining the time-frequency resource in the first frequency band, and wherein the first indication information is a bit map comprising x0, which represents that the frequency domain unit is used for transmitting a signal, and x1, which represents that the frequency domain unit is not intended to be used for transmitting a signal; and
   performing signal communication, by the first terminal device with the first network device, on the time-frequency resource within the first frequency band,
   wherein the interference comprises degree of impact on the first terminal device by the interference caused by the second frequency band to the first frequency band.

2. The method of claim 1, wherein the second frequency band is used for transmitting an uplink signal.

3. The method of claim 1, wherein a cell corresponding to the second frequency band is a primary cell.

4. The method of claim 1, wherein sending, by the first terminal device, the second indication information to the second network device comprises:
   sending, by the first terminal device, a first message to the second network device, wherein the first message carries an access capability of the first terminal device and the second indication information; or
   sending, by the first terminal device, the second indication information to the second network device when carrier aggregation is enabled; or
   sending, by the first terminal device, the second indication information to the second network device when determining that a plurality of frequency bands configured for the first terminal device are capable of generating interference.

5. A network device, comprising a memory, a processor, an input interface, and an output interface, wherein the memory, the processor, the input interface and the output interface are connected through a bus system, the memory is used for storing instructions, and the processor is used for executing the instructions stored in the memory to:
   receive, through the input interface, second indication information sent from a first terminal device, wherein the second indication information is used for indicating interference information of interference caused by a second frequency band to a first frequency band, wherein the interference comprises at least one of harmonic interference or intermodulation interference, wherein the first frequency band is a new radio (NR) carrier, wherein the second frequency band is a long term evolution (LTE) carrier, and wherein the second indication information is used for the network device to determine first indication information sent to a first network device; and
   send, through the output interface, the first indication information to the first network device based on the interference caused by the second frequency band to the first frequency band, wherein the first indication information is used for indicating a scheduling mode of each frequency domain unit in the first frequency band, and wherein the scheduling mode of each frequency domain unit in the first frequency band is used for the first network device to determine a time-frequency resource within the first frequency band for signal transmission between the first terminal device and the first network device,
   wherein the first indication information is a bit map comprising x0, which represents that the frequency domain unit is used for transmitting a signal, and x1, which represents that the frequency domain unit is not intended to be used for transmitting a signal,
   wherein the interference comprises degree of impact on the first terminal device by the interference caused by the second frequency band to the first frequency band.

6. The network device of claim 5, wherein the second frequency band is used for transmitting an uplink signal.

7. The network device of claim 5, wherein a cell corresponding to the second frequency band is a primary cell.

* * * * *